CONTINUOUS THIN MAGNETIC FILM STORAGE DEVICE

INVENTORS:
HEINZ RAILLARD,
IRVING W. WOLF,

BY Marvin L. Goldenberg
THEIR ATTORNEY.

INVENTORS:
HEINZ RAILLARD,
IRVING W. WOLF,
BY Marvin R. Goldenberg
THEIR ATTORNEY.

3,439,349
CONTINUOUS THIN MAGNETIC FILM STORAGE DEVICE

Heinz Raillard, Liverpool, N.Y., and Irving W. Wolf, Palo Alto, Calif., assignors to General Electric Company, a corporation of New York Filed Jan. 21, 1965, Ser. No. 426,810
Int. Cl. G11b 5/00; G11c 11/14
U.S. Cl. 340—174 14 Claims

ABSTRACT OF THE DISCLOSURE

A high speed thin magnetic film storage device having information elements positioned in close proximity which remain stable over long periods of nondestructive readout operation. A bias D.C. magnetic field is applied in a direction transverse to the film's "easy" axis for establishing a rest magnetization oblique to said "easy" axis. Readout is accomplished by drive means which provide a rapid rotation of the flux through a limited angle, with the output obtained from sense means coupled to said elements and responsive to flux change therein.

The invention relates to thin magnetic film storage devices wherein information in electrical form is stored as a corresponding remanent magnetization, and more particularly to an improved continuous thin magnetic film storage device of the nondestructive readout type.

A recent development in the field of magnetic storage or memory devices has been the employment of thin films for providing the storage property in lieu of bulk type magnetic elements such as magnetic core structures. This film devices, in general, offer a number of important advantages over the prior structures. They respond very rapidly to applied information; i.e., a rapid change in flux in the magnetic films can be made to occur. Thus, they can be operated at extremely high frequencies, in the tens of megacycles region, with low power requirements. Having a planar configuration, they require but a fraction of the volume as compared to the bulk type magnetic devices, and the packing density of discrete information elements may be therefore much higher. The geometry of the thin film devices is also compatible with that of integrated electronic circuitry. Furthermore, the employment of a continuous film, as compared to isolated film elements, is found to have appreciable advantage since the fabrication is simpler and the quality of the film behavior better.

In continuous thin film storage devices, a plurality of discrete information elements or domains are formed within the film. The film is magnetically anisotropic in nature, being characterized by a remanent magnetization which is aligned along only a single axis, commonly termed the "easy" axis, and which in response to a transverse drive follows a rotational path away from the "easy" axis. Binary information of a "1" or "0" is stored by providing within each of the various domains of the film a remanent magnetization oriented in one of the two opposing directions along said "easy" axis, this rest orientation being a function of the applied information.

For nondestructive readout, drive conductors are provided which generate a magnetic field in a direction transverse to said "easy" axis for rotating the magnetization vectors of said domains by an angle less than 90° so that upon release of the drive energization the magnetization vectors resume their former rest position. Sense conductors are coupled to each domain for responding to the flux change in the domains produced by the drive energization and providing an output indicative of the stored information.

In order that the storage density be maximized, it is obviously desirable that the information elements, the individual size of which is small and is determined by the inherent magnetic properties of the film, be positioned as close together as possible. It has been found, however, that when the elements are closely spaced, the walls thereof perpendicular to the "easy" axis tend to interact with the film portions separating the elements that are of opposite magnetization so as to cause the elements to shrink and even disappear during the course of successive readout operations. This phenomenon, known as "wall creeping," can be obviated by providing adequate separation between information elements. However, this is not a desirable solution since the separations required to ensure that the condition will not exist have been found to be prohibitively large, detracting appreciably from the inherent advantage of this form of construction.

In the prior art use of thin films, it has also been found that the drive and sense conductors, which must be in close proximity in their association with the thin film information elements, exhibit both an inductive and capacitive coupling directly therebetween, in addition to the signal inductive coupling through the film elements, which presents noise in the output of the sense conductors. A method employed for eliminating such noise is to provide a pair of sense conductors connected in balanced relationship so as to obtain cancellation of the noise in the derived output. This technique is undesirable because a carefully balanced system is difficult to achieve and in addition requires a redundancy of component parts.

The present invention is intended to overcome the above indicated limitations of the thin magnetic film storage device and thereby add measurably to the utility and application of such devices.

It is accordingly an object of the present invention to provide a novel, high speed, continuous thin magnetic film storage device wherein the information elements of the film can be positioned in close proximity and will remain stable over long periods of nondestructive readout operation.

It is a further object of the present invention to provide a novel continuous thin magnetic film storage device as above described wherein the domain walls of the film information elements remain essentially fixed in position over long periods of nondestructive readout operation.

It is another object of the present invention to provide a novel thin magnetic film storage device of the above described type in which the output signal has a low noise level.

It is yet a further object of the present invention to provide a novel thin magnetic film storage device in which a low noise level is obtained in the output signal by providing, in a novel manner, cancellation of noise due to direct capacitive and inductive coupling effects between the drive and sense conductors of said device.

Another object of the present invention is to provide a novel thin magnetic film storage device in which the above noted noise cancellation is effected by a relatively simple construction.

A further object of the present invention is to provide a novel thin magnetic film storage device of the above described type, having a distributed transmission line construction which can be readily operated in the UHF region and which produce relatively high power output signals.

Briefly, these and other objects of the invention are accomplished in a magnetic storage device employing a continuous thin film deposited on a substrate, there being formed within said film an array of information elements having stored binary information. The thin film is composed of an anisotropic magnetic material which exhibits a remanent magnetization aligned along only a single axis, in the absence of externally applied fields the stored information being represented by a remanent magnetization oriented in one of two opposing directions along said single axis. The stored information is read out by drive means inductively coupled to said information elements for rotating the flux therein through a limited angle, and sense means inductively coupled to said elements which are responsive to the flux change therein.

In accordance with one aspect of the invention there is provided a D.C. bias magnetization of a given magnitude in a direction transverse to said single axis, the magnetization vectors of the various information elements being thereby rotated toward the transverse direction to assume predetermined rest positions at a given angle with said single axis. In this manner, rest magnetizations of opposite sense are no longer in opposing directions along the single axis, but become oriented at an obtuse angle. Thus, as the flux is changed in each information element during successive readout operations, the domains are found to remain essentially unchanged.

In accordance with a further aspect of the invention, the drive and sense means include distributed strip transmission lines terminated so as to suppress reflected energy, the sense lines being oriented with respect to the drive lines so that the direct inductive and capacitive coupling therebetween are cancelled out in one branch of the sense conductor, from which branch the output signal is taken.

While the specification concludes with claims particularly pointing out and distinctly claiming the invention, it is believed that the invention will be better understood from the following description taken in connection with the accompanying drawings in which:

Figure 1A:
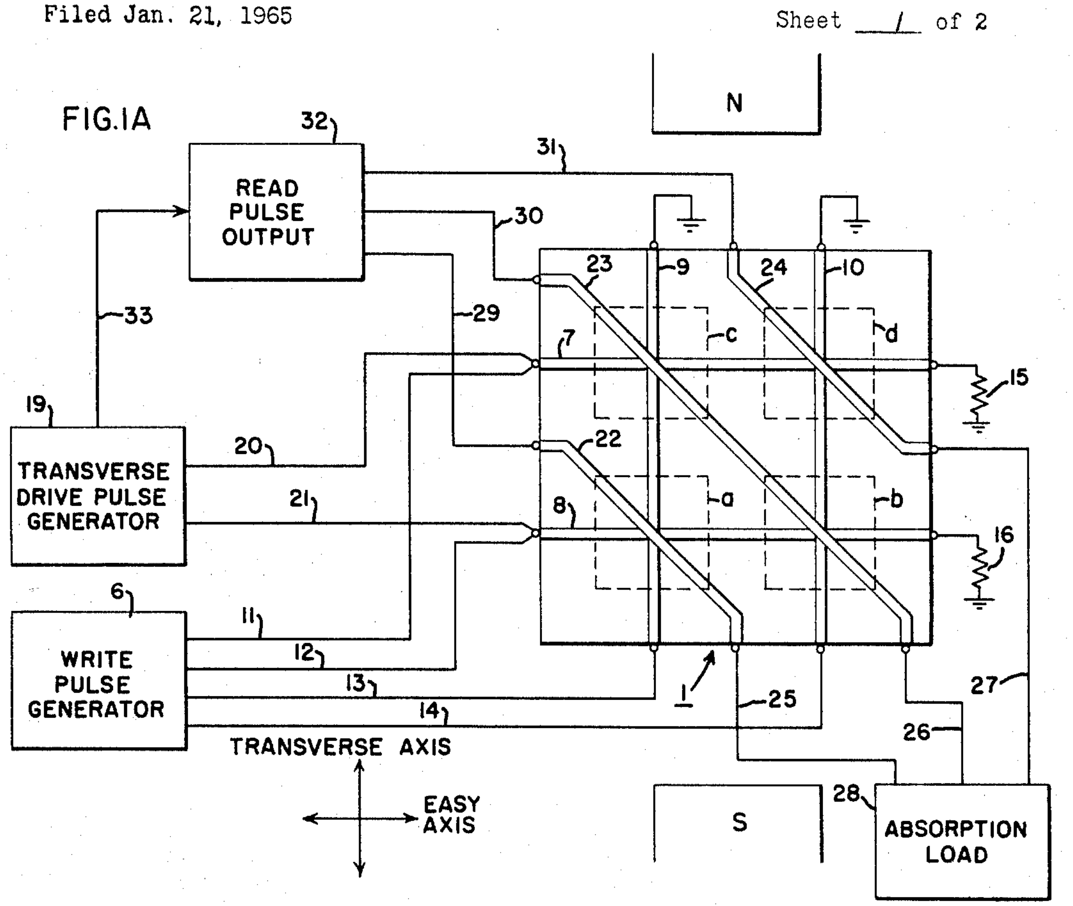
FIGURE 1A is a schematic diagram, in plan view, of a thin magnetic film storage device in accordance with the invention.
Figure 1B:
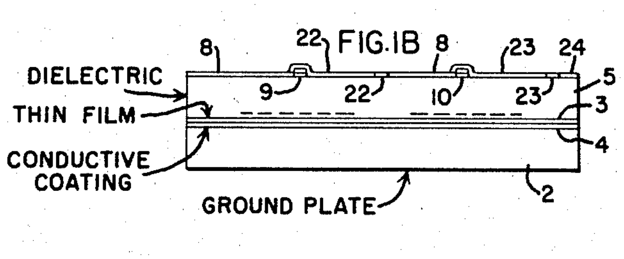
FIGURE 1B is a front view of the thin film structure of the device of FIGURE 1A.

Considering now a detailed description of the drawings, in FIGURE 1A there is diagrammatically illustrated, in accordance with the invention, a plan view of a continuous thin magnetic film storage device 1 having a number of bits of binary information stored therein, wherein a nondestructive readout of the information is provided in a normally cyclical operation. As shown in the front view of FIGURE 1B, the device 1 includes a stacked arrangement of a ground plate 2, a continuous thin film 3 of ferromagnetic material, a thin conductive coating 4, and a layer 5 of dielectric material. The thin film is deposited onto the undersurface of the dielectric layer 5, the undersurface of the thin film having deposited thereon the conductive coating 4. This integral structure is then fastened in electrical contact with the ground plate 2. The ground plate is typically made of brass. The dielectric layer 5 may be a thin glass plate. The thin conductive coating is typically of copper for providing a uniform ground connection with the ground plate 2, the surfaces of which are normally uneven. The ferromagnetic material of the thin film 3 is magnetically anisotropic, of the type exhibiting a remanent magnetization along a single axis only, which is termed the preferred or "easy" axis. Commonly nickel-iron permalloy films are used, although numerous other magnetic film compositions are known to the art. In one conventional method of film fabrication, the film is deposited by an electroplating process onto a dielectric surface in the presence of a D.C. magnetic field.

The thin film 3 is composed of an array of domains or elements individually magnetized in accordance with a given digital information bit. These elements, which in practice exist by virtue of their individual magnetization states, are schematically illustrated by the broken line rectangular outlines *a*, *b*, *c* and *d*. Typically, a binary ONE or ZERO is stored, the stored information being contained in the alignment in one of two discrete directions of the remanent magnetization vectors within said elements. This will be further explained when considering FIGURES 2A and 2B. Although for ease of illustration, only a limited number of information elements appear in FIGURE 1, in many practical devices the number of elements will be on the order of hundreds and greater.

A WRITE pulse generator 6 together with strip line conductors 7, 8, 9 and 10 are employed in a conventional manner for writing the binary information into the information elements. Conductors 7 to 10 overlay the surface of the dielectric layer 5 and in combination with the ground plane of ground plate 2 and conductive coating 4 form distributed transmission lines. Conductors 7 to 10 are each provided with an insulating coat, not illustrated, so that they do not make ohmic connection at regions of intersection. Conductors 7 and 8 are directed along the "easy" axis and conductors 9 and 10 are along the transverse axis, the "easy" and transverse axes being illustrated in FIGURE 1A. Pulse generator 6 is shown connected to conductors 7, 8, 9 and 10 by suitable distributed transmission line structures, schematically illustrated by connecting lines 11, 12, 13 and 14, respectively. Strip line conductors 7 and 8 are terminated in their characteristic impedances 15 and 16 for the purpose of minimizing reflected energy in these lines during the readout operation, as will be discussed in greater detail presently. Strip line conductors 9 and 10 are terminated directly to ground.

In the regions where the conductors intersect are formed the various information elements. Information bits are stored in each information element in response to the selective energization by pulse generator 6 of the pair of orthogonally intersecting conductors associated with each information element. The selective energization by pulse generator 6 thereby orients the magnetization vectors in each information element in one of two discrete rest positions, as a function of the applied information.

A transverse D.C. bias magnetization is provided within the thin film 3 by appropriate D.C. magnetizing means, schematically illustrated by magnet pole shoes N and S. In practice, a pair of solenoids have been employed, one at each pole shoe position. The D.C. bias magnetization is of a magnitude that will cause a limited rotation of the magnetization vectors of the information elements and the regions between elements, away from the "easy" axis and thereby provide a rest orientation at an acute angle with said "easy" axis. In this manner, adjacent magnetization vectors along the "easy" axis are not in direct opposition and, as will be considered in greater detail presently, interaction between proximate magnetization vectors of opposite sense through successive non-destructive readout cycles is avoided.

The information stored in the elements of the illustrated storage device is nondestructively read out by means of a transverse drive pulse generator 19 and strip conductors 7 and 8, the latter conductors being coupled to generator 19 by connecting lines 20 and 21, respectively. Generator 19 is preferably of the type generating high frequency pulses, in the very high frequency to ultra high frequency range, of narrow width and extremely short rise-timers. Short rise-time drive pulses are desirable for efficiently generating relatively high voltage pulses in the output of the device. In response to the selective energization of conductors 7 and 8 the magnetization vectors of the excited elements are transiently rotated from their rest positions and thereby exhibit a rapid flux change.

Sense means coupled to the information elements respond to the flux change caused by the drive pulses and provide an output pulse indicative of the stored information within each element. The sense means includes distributed transmission line strip line conductors 22, 23 and 24 which overlay the dielectric layer 5 at an oblique angle. Conductors 22 to 24 are each insulated and have common intersections with the orthogonally disposed conductors. First terminals of sense conductors 22, 23 and 24 are connected by suitable connecting lines 25, 26 and 27, rsepectively, to an absorption load 28 and terminated in their characteristic impedances to avoid the reflection of energy. The other terminals are connected by suitable lines 29, 30 and 31 to a READ pulse output 32, which may be one of numerous conventional devices or circuits for responding to the output pulses induced in the sense conductors. In the embodiment presented, a connection exists between drive pulse generator 19 and the READ circuitry, schematically illustrated by line 33, which identifies the information element being read out. For example, if element *c* is to be read out, drive line 7 is pulsed which induces an output signal in sense lines 23 and 24. The connection 33 identifies the output signal in line 23 as originating in element *c*, rather than element *b* which is also coupled to sense conductor 23.

The sense conductors 22, 23 and 24 assume an oblique direction with respect to the drive conductors 7 and 8 for the purpose of, in general, discriminately responding to the flux change occasioned by the drive pulses. As an additional constraint regarding the direction of the sense conductors, at each information element they singly intersect the drive conductors at an angle which provides cancellation in the output of noise due to direct inductive and capacitive coupling between the intersecting sense and drive conductors, as will be described more fully when considering FIGURES 4 and 5.

Figure 2A:
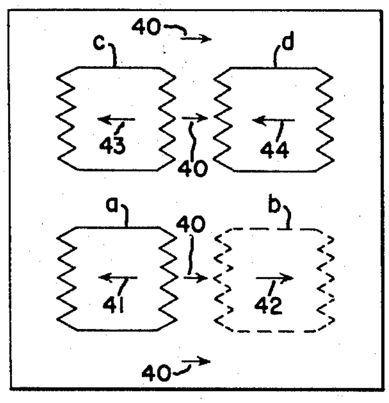
FIGURE 2A is a graphic illustration of the magnetization of the thin magnetic film of FIGURE 1 with no D.C. bias aplied.

In FIGURE 2A, there are graphically illustrated unbiased magnetization vectors for information elements *a, b, c* and *d* and their surrounding regions of the thin film storage device of FIGURE 1A, representing a particular information content. The magnetization vectors are directed along the "easy" axis and are illustrated as they would appear in the absence of the applied D.C. bias magnetization. Prior to the entering of information into the information elements, the magnetic film is uniformly magnetized in an initial state of remanent magnetization, the direction of which may be illustrated by the arrows 40. This direction along the "easy" axis may be assumed to represent a ZERO information bit, the magnetization along the "easy" axis in the opposite direction representing a ONE information bit. It is therefore seen that information elements *a, c* and *d* contain stored ONES, as indicated by arrows 41, 43 and 44, and information element *b* has a stored ZERO, as indicated by arrow 42.

Figure 2B:
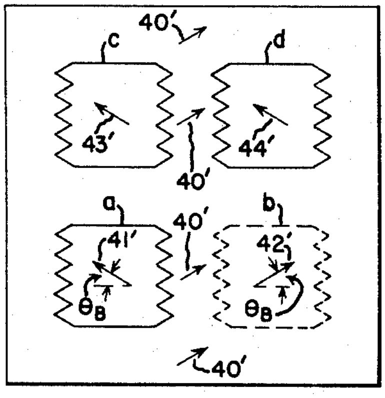
FIGURE 2B is a graphic illustration of the thin magnetic film magnetization with D.C. bias applied.

In FIGURE 2B is a corresponding graphical illustration of the magnetization vectors in elements *a, b, c* and *d*, where, in accordance with the invention, the magnetization vectors are rotated away from the "easy" axis by an angle $\theta_B$ under the influence of the applied D.C. bias magnetization. Accordingly, arrows 40' and 42' indicate the bias established ZERO direction, and arrows 41', 43' and 44' indicate the bias established ONE direction. The angle $\theta_B$ is obtained from the following general expression:

$$\sin \theta = H/H_K \qquad (1)$$

where $\theta$ is a given angle made by the magnetization vector with the "easy" axis, $H_K$ is the magnetic field strength required for rotating the magnetization vector to the transverse axis, and H is the applied magnetic field strength. For an angle $\theta$ equal to $\theta_B$, H is then the field strength producing the D.C. bias magnetization. The angle $\theta_B$ must be large enough to eliminate interaction between adjacent magnetizations of opposite sense during the nondestructive readout cycling, yet small enough to facilitate the writing in and reading out of the digital information. Although not intended to be limitations, in practice, values of $\theta_B$ between about 30° and 40° have been found to be suitable.

With respect to the writing operation and considering again FIGURE 1A, a ONE is written into information element *a* in one exemplary mode by simultaneously energizing strip line conductors 8 and 9, conductor 8 being provided with a pulse of either polarity and conductor 9 with a pulse of positive polarity. The pulse applied to strip conductor 8 produces in element *a* a magnetic field in the transverse direction of a magnitude somewhat less than $H_K$. The positive pulse applied to strip conductor 9 produces a magnetic field along the "easy" axis that in combination with the energization of strip conductor 8 causes the magnetization vector in element *a*, assumed to be initially in the ZERO direction, to rotate into the ONE direction, as indicated by the arrow 41'. The angle of rotation is $180° - 2\theta_B$. It is noted that energization of strip conductor 9 must be insufficient of itself to change the remanent magnetization orientation but will do so only in concert with the energization of strip conductor 8.

For writing a ZERO information bit, as in information element *b*, strip conductor 8 is energized as before and strip conductor 10 is simultaneously energized with a pulse of negative polarity to provide a magnetic field along the "easy" axis in a direction opposite to that previously considered for writing a ONE. If element *b* was formerly in a ZERO condition no change in its magnetization would be produced. However, if it were previously in a ONE condition, the magnetization vector would now rotate so as to be in the ZERO direction, shown by arrow 42'.

Considering now the readout operation of the device of FIGURE 1A with information being stored as indicated in FIGURE 2B, nondestructive readout is provided by application of drive pulses from pulse generator 19. In the preferred operation, the drive pulses have repetition frequencies in the megacycle range, e.g., on the order of 50 to 100 megacycles, each pulse being about 1–5 nanoseconds in width with exceedingly short rise-times of about .5 nanoseconds. As a characteristic of thin film magnetic material, the magnitude of flux that couples into its limited volume is low as compared to the bulk magnetic materials of the more common core storage devices, etc. Thus, the inductance of the thin film is very low. In itself this presents a two-fold advantage. These films are capable of rapid rates of flux change and therefore can be operated at extremely high frequencies. Further, they have low power requirements and low power components may be employed in the associated circuitry.

The drive pulses in being applied to conductors 7 and 8 provide a momentary magnetic field in the transverse direction so as to cause a rapid change in flux in each of the information elements. The flux change is manifested in a transient rotation of the magnetization vectors towards the transverse axis and return to rest position during each drive pulse. The magnitude of the drive pulse must be sufficiently less than $H_K$ so that the magnetization vectors do not too closely approach the transverse axis and thereby destroy the stored information. The termination impedances 15 and 16 prevent reflections from occurring in the drive transmission lines 7 and 8. It is necessary to avoid reflections at operating frequencies in which the period of drive pulses is on the order of the pulse propagation time in the line so as to avoid spurious responses in the output.

The flux change occurring in the information elements *a, b, c* and *d* is sensed by the sense conductors 22, 23 and 24 to provide output pulses in accordance with the stored information content. For example, the information element $a$ having a ONE stored thereing generates a pulse of a particular characteristic, e.g., of a magnitude exceeding a given threshold value, and is detected in the READ output circuit 32. The information element $b$ having a ZERO stored therein generates a pulse of a different characteristic, e.g., having a magnitude less than said threshold value.

As may be anticipated, the output pulse differential in the sense conductors for a stored ONE or ZERO, in addition to being a function of the rate of drive current, is a function of primarily the angle made by the sense conductors across the information elements, the rest position of the magnetization vectors, and the angle through which said vectors are rotated in response to the drive energy.

If it is assumed that the sense conductors are laid at an angle $\beta$ with respect to the "easy" axis, the signal voltage $v_s$ induced in the sense wire may be expressed as:

$$v_s=\phi_m\cdot\cos(\beta-\theta)\frac{d\theta}{dt} \quad (2)$$

where $\phi_m$ is the rotating portion of the flux intercepted by the sense conductor at optimum angle position. From Equation 1 there can be written:

$$\frac{d\theta}{dt}=\frac{1}{\cos\theta}\cdot\frac{d(H/H_k)}{dt} \quad (3)$$

and by direct substitution in Equation 2 there is obtained:

$$v_s=[\sin\beta\cdot\tan\theta+\cos\beta]\cdot\phi_m\cdot\frac{d(H/H_k)}{dt} \quad (4)$$

where $$\tan\theta=\frac{H/H_k}{\sqrt{1-(H/H_k)^2}}$$

Figure 3:
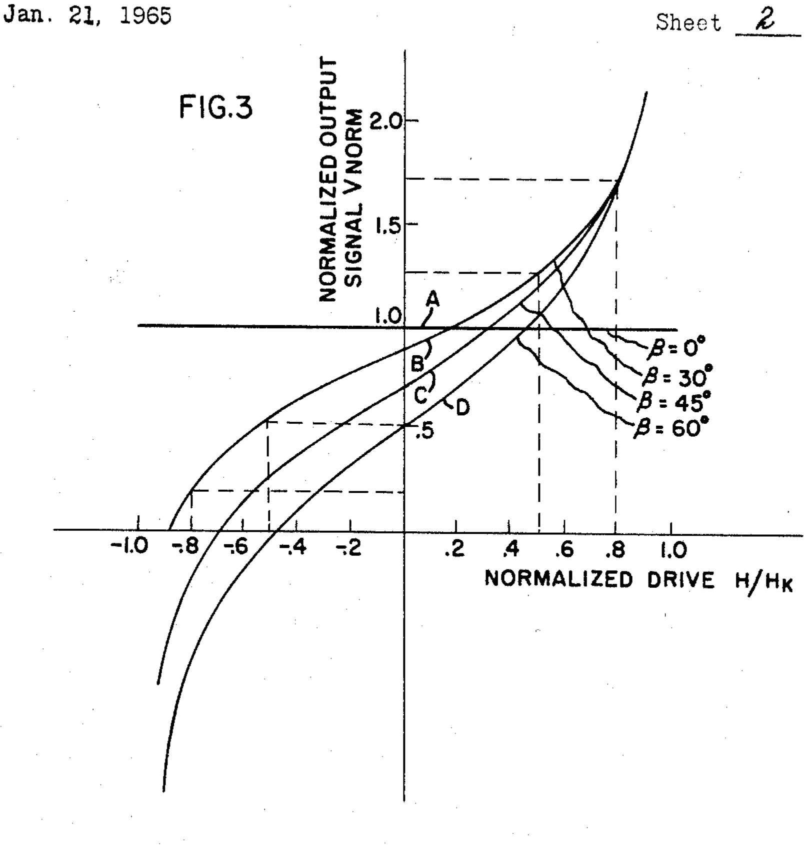
FIGURE 3 is a series of curves useful in explaining the operation of the device of FIGURE 1.

The trigonometric expression in brackets in Equation 4 is the normalized output signal in the sense conductors, denoted as $V_{norm}$, which is plotted in FIGURE 3 as a function of the normalized drive $H/H_k$ for different values of $\beta$. Thus, curves A, B, C and D are for $\beta$ values of 0°, 30°, 45° and 60°, respectively. In an exemplary operation the value of $H/H_k$ changes between .5 and .8 for a stored ONE. It can be readily shown that for a stored ZERO, $H/H_k$ will correspondingly change between —.5 and —.8. This change in the normalized drive corresponds to rotating the magnetization vector between $\theta$ equal to 30°, which would be at the rest position, to $\theta$ equal to about 53°. It may be seen from curve B that for an angle $\beta$ of 30° the normalized output increases from about 1.3 to 1.7 for a stored ONE information. For a stored ZERO information there is generated a normalized output changing from about .5 to .2. From an examination of the various curves in FIGURE 3, it may be seen that for a wide range of $\beta$ values, e.g., between about 30° and 60°, readily discriminated output signals of relatively large amplitude may be generated. For a given operation, considerable flexibility therefore exists in selecting an optimum angle $\beta$ which satisfies the above presented conditions and also provides good noise cancellation.

Figure 4:
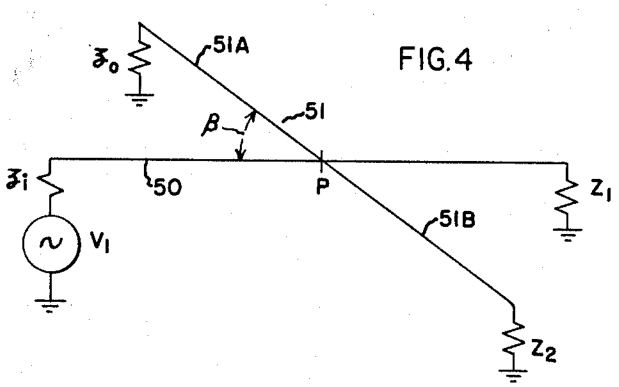
FIGURE 4 is a schematic circuit diagram corresponding to the transmission line structure employed in FIGURE 1.

The effective considerations in determining the angle $\beta$ in providing optimum noise cancellation are somewhat more critical than with respect to obtaining suitable output signals. Referring to FIGURE 4, there is shown in schematic form a transmission line structure including a pair of intersecting conductors 50 and 51 which are energized and terminated so as to generally correspond to any one of intersecting drive-sense conductor pairs associated with each information element in FIGURE 1A. Conductor 50 corresponds to the drive conductor and conductor 51 to the sense conductor. A drive voltage source $V_1$ of internal impedance $z_i$, corresponding to the voltage generated by generator 19, is connected to one terminal of the conductor 50, the other end of which is terminated by the line's characteristic impedance $Z_1$. The conductors intersect at point P, no ohmic contact actually being made. One branch 51A of the sense conductor is coupled to an output impedance $z_o$, and the other branch 51B is connected to an absorption load impedance $Z_2$.

Figure 5:
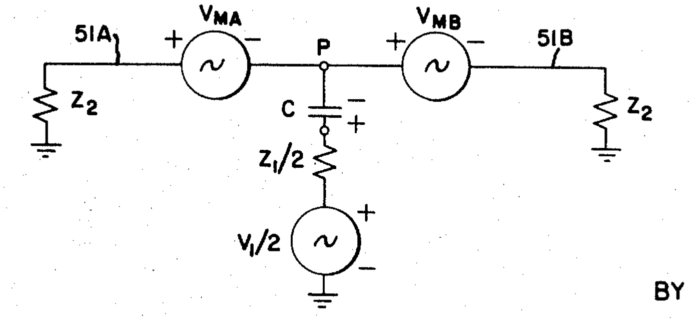
FIGURE 5 is an equivalent circuit diagram of the transmission line structure of FIGURE 4.

Both an inductive and a capacitive coupling exists between the intersecting conductors 50 and 51 which is schematically illustrated in the equivalent circuit of FIGURE 5. In order to simplify the circuit of FIGURE 5, it is assumed that $z_i$ and $z_o$ are equal to $Z_1$ and $Z_2$, respectively. In practice, output impedance $z_o$ is normally very low, as when employing a tunnel diode in the output circuit to respond to the sense signals. However, the simplifying assumption is valid for purposes of the analysis being made. Accordingly, in FIGURE 5 there are inserted in branches 51A and 51B voltage sources $V_{mA}$ and $V_{mB}$, respectively, which represent the induced voltage in these branches due to inductive coupling between the conductors 50 and 51. A further voltage source $V_1/2$ coupled to an impedance $Z_1/2$, which is the even in equivalent of the energized drive transmission line 50 of FIGURE 4, is connected by a capacitor C to the junction of branches 51A and 51B at point P. The capacitor C represents the distributive capacitive coupling existing between the drive and sense lines. It is seen that the voltage drop across the capacitor C opposes the inductive voltage increase $V_{mA}$ in branch 51A, and is added to the inductive voltage drop $V_{mB}$ in branch 51B. If the voltage across the capacitance C, $V_c$, is equated in magnitude to $V_m$, cancellation of the voltages will occur in branch 51A, thereby providing an output in this branch free from noise. In branch 51B the voltages add, to be dissipated in the terminating impedance $Z_2$.

The inductive voltage magnitude $V_m$ is a function primarily of the rate of change of drive current and the mutual inductance existing between the drive and sense transmission lines. The mutual inductance in turn is largely a function of the angle between the sense and drive conductors. The capacitive voltage $V_c$ is a function largely of the rate of change of drive current, so that the shape of the two induced voltages $V_m$ and $V_c$ is comparable, and of the capacitance. Similar to the mutual inductance, the capacitance too varies with the angle of intersection between the coupled conductors. However, the mutual inductance varies greater with respect to angle variation than does the capacitance. Thus, by adjusting the angle $\beta$ between the two conductors an optimum angle may be readily found which provides cancellation of the inductive and capacitive voltages effective in branch 51A. By controlling the mutual inductance and capacitance values by means of the construction and configuration of the device, this optimum angle can be readily made to exist in the region between 30° and 60° where, referring back to FIGURE 4, it is seen that good discrimination in output pulses for different stored information bits is provided.

It is seen that the thin film memory structure that is provided in accordance with the instant invention permits a continuous non-destructive readout of stored information with a high degree of stability. Further, the noise cancellation properties of the device, in combination with the nonreflective nature of the drive and sense distributed transmission lines, makes possible the employment of exceedingly high frequency drives providing drive current rise times that are compatible with the rapid flux change capabilities of the low inductance thin film compositions. As a result, relatively high power output signals are readily derived within a low power circuit environment.

It may be appreciated that numerous modifications may be made to the hereinbefore described device which would not exceed the basic teaching provided. For example, the thin film can be deposited on the exterior surface of the dielectric layer, with the strip line conductors directly overlaid. In addition, the conductive coating is not necessary if a sufficiently uniform contact can be obtained between the thin film and the ground plate.

The appended claims are intended to embrace all modifications that would normally be included within the true scope of the invention.

What we claim as new and desire to secure by Letters Patent of the United States is:

1. A magnetic storage device comprising:

(a) a storage member of anisotropic magnetic material exhibiting a remanent magnetization along a single axis, digital information stored within said member as a magnetization vector oriented in one of two discrete rest positions, (b) bias means for providing to said storage member a D.C. magnetization component along an axis transverse to said single axis, said D.C. magnetization in combination with the remanent magnetization properties of said film causing said two discrete rest positions to be rotated from said single axis and to assume an angle less than 180° with respect to each other, (c) drive means inductively coupled to said storage member for producing a pulsed magnetization along said transverse axis so as to rapidly rotate said information bearing magnetization vector away from said single axis, and (d) sense means inductively coupled to said storage member responsive to rotation of said magnetization vector for deriving an output that is a function of the information stored.

2. A magnetic storage device as in claim 1 wherein said drive and sense means are composed of distributed transmission lines having a distributed capacitive and inductive coupling existing directly therebetween, the drive and sense transmission lines being arranged at an angle with respect to each other so as to produce substantial equality in the magnitude of the voltages induced by said capacitive and inductive coupling and thereby provide cancellation of said voltages in one branch of said sense transmission line from which the output signal is taken.

3. A magnetic storage device as in claim 2 wherein one end of said distributed transmission lines is terminated in their respective characteristic impedances so as to substantially avoid energy reflection within said lines.

4. A thin magnetic film storage device comprising:

(a) a thin film of anisotropic magnetic material exhibiting a remanent magnetization along a single axis in the plane of said film, digital information stored within said film as a magnetization vector oriented in one of two discrete rest positions, (b) a substrate for supporting said thin film, (c) bias means for providing to said thin film a D.C. magnetization along an axis in the plane of said film transverse to said single axis, said D.C. magnetization in combination with the remanent magnetization properties of said film causing said two discrete rest positions to be rotated from said single axis and to assume an angle less than 180° with respect to each other, (d) drive means inductively coupled with said film for producing a pulsed magnetization along said transverse axis so as to momentarily rotate said information bearing magnetization vector away from said single axis, and (e) sense means inductively coupled with said thin film responsive to the rotation of said magnetization vector for deriving an output which is a function of the information stored.

5. A thin magnetic film storage device as in claim 4 wherein said drive and sense means are composed of distributed transmission lines having a distributed capacitive and inductive coupling existing directly therebetween, the drive and sense transmission lines being arranged at an angle with respect to each other so as to produce substantial equality in the magnitude of the voltages induced by said capacitive and inductive coupling and thereby provide cancellation of said voltages in one branch of said sense transmission line from which the output signal is taken.

6. A thin magnetic film storage device as in claim 5 wherein the drive and sense transmission lines are terminated at one end in their respective characteristic impedances so as to substantially avoid energy reflection within said lines.

7. A thin magnetic film storage device as in claim 6 wherein said thin film is composed of an array of information elements proximately arranged in the film plane, the elements being formed by the selective orientation of the magnetization in localized regions of said film in accordance with the input digital information, there being at least a drive and sense means coupled to each information element.

8. A thin magnetic film storage device comprising:

(a) a thin film of anisotropic magnetic material which exhibits a remanent magnetization along a single axis in the plane of said film, digital information stored within said film as a magnetization vector oriented in one of two discrete rest positions, (b) a layer of dielectric material having said thin film deposited on one surface thereof, (c) a ground plane for supporting in a stacked arrangement the thin film coated dielectric layer, (d) bias means for providing to said film a D.C. magnetization component along an axis in the plane of said film transverse to said single axis, said D.C. magnetization component in combination with the remanent magnetization properties of said film causing said two discrete rest positions to be rotated from said single axis and to assume an angle less than 180° with respect to each other, (e) a drive conductor overlaying the ungrounded surface of said stacked arrangement and forming with said ground plane a drive strip transmission line in inductive coupling relationship with said thin film, said transmission line being generally in a direction along said single axis, (f) means for energizing the drive transmission line so as to successively rotate said information bearing magnetization vector between its rest position and a position further away from said single axis, (g) a sense conductor overlaying the ungrounded surface of said stacked arrangement and forming with said ground plane a sense strip transmission line in inductively coupled relationship with said thin film, said sense transmission line being obliquely directed with respect to and intersecting the drive transmission line so as to be responsive to the rotation of said magnetization vector for deriving an output that is a function of the information stored.

9. A thin magnetic film storage device as in claim 8 wherein said drive and sense transmission lines have a distributed capacitive and inductive coupling existing directly therebetween which induce in the sense transmission line voltages $V_c$ and $V_m$, respectively, the magnitude of said voltages being a function of the angle extending between said lines, said angle being selected to produce substantial equality in said magnitudes and thereby provide cancellation of the induced voltages in one branch of said sense transmission line from which the output signal is taken.

10. A thin magnetic film storage device as in claim 9 wherein the drive and sense conductors are terminated at one end of their respective characteristic impedances so as to substantially avoid energy reflection within the drive and sense transmission lines.

11. A thin magnetic film storage device as in claim 10 wherein said thin film is composed of an array of information elements proximately arranged in the film plane, the elements being formed by the selective orientation of the magnetization in localized regions of said film in accordance with the input digital information, there being at least a drive and sense conductor coupled to each information element.

12. A thin magnetic film storage device as in claim 11 wherein the means for energizing the drive line is a pulse generator operated in the megacycle region and generating pulses having extremely short rise times on the order of nanoseconds.

13. A thin magnetic film storage device comprising:

(a) a thin film of anisotropic magnetic material which exhibits a remanent magnetization along a single axis in the plane of said film, digital information stored within said film as a magnetization vector oriented in one of two discrete rest positions, (b) a layer of dielectric material having said thin film deposited on one surface thereof, (c) a ground plane for supporting in a stacked arrangement the thin film coated dielectric layer, (d) a drive conductor overlaying the ungrounded surface of said stacked arrangement and forming with said ground plane a drive strip transmission line in inductive coupling relationship with said thin film, said transmission line being generally in a direction along said single axis, (e) means for terminating one end of said drive transmission line so as to substantially avoid energy reflection within said line, (f) means for energizing the other end of said drive transmission line so as to successively rotate said information bearing magnetization vector between its rest position and a position further away from said single axis, (g) a sense conductor overlaying the ungrounded surface of said stacked arrangement and forming with said ground plane a sense strip transmission line in inductively coupled relationship with said thin film, said sense transmission line being obliquely directed with respect to and intersecting the drive transmission line so as to be responsive to the rotation of said magnetization vector for driving an output that is a function of the information stored, and (h) means for terminating one end of said sense transmission line so as to substantially avoid energy reflection within said sense transmission line.

14. A thin magnetic film storage device as in claim 13 wherein said drive and sense transmission lines have a distributed capacitive and inductive coupling existing therebetween which induce in the sense transmission line voltages $V_c$ and $V_m$, respectively, the magnitude of said voltages being a function of the angle extending between said lines, said angle being selected to produce substantial equality in said magnitudes and thereby provide cancellation of the induced voltages in one branch of said sense transmission line from which the output signal is taken.

References Cited

UNITED STATES PATENTS

| | | | |
|---|---|---|---|
| 3,263,213 | 7/1966 | Pohm | 340—174 |
| 3,292,162 | 12/1966 | Chong | 340—174 |

BERNARD KONICK, *Primary Examiner.*

P. SPERBER, *Assistant Examiner.*